(12) United States Patent  
Kyle et al.

(10) Patent No.: US 10,221,683 B2  
(45) Date of Patent: Mar. 5, 2019

(54) ACOUSTICALLY COUPLED TRANSMITTER FOR DOWNHOLE TELEMETRY

(71) Applicant: Halliburton Energy Services, Inc., Houston, TX (US)

(72) Inventors: Donald Kyle, Plano, TX (US); Michael Linley Fripp, Carrollton, TX (US); Gregory Thomas Werkheiser, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/125,100

(22) PCT Filed: Apr. 7, 2014

(86) PCT No.: PCT/US2014/033217  
§ 371 (c)(1),  
(2) Date: Sep. 9, 2016

(87) PCT Pub. No.: WO2015/156768  
PCT Pub. Date: Oct. 15, 2015

(65) Prior Publication Data  
US 2017/0114635 A1    Apr. 27, 2017

(51) Int. Cl.  
*E21B 47/16* (2006.01)  
*H04L 12/24* (2006.01)  
*G01V 1/46* (2006.01)  
*G01V 1/48* (2006.01)  
*G08C 19/22* (2006.01)  
*G01V 1/40* (2006.01)

(52) U.S. Cl.  
CPC ............... *E21B 47/16* (2013.01); *G01V 1/40* (2013.01); *G01V 1/46* (2013.01); *G01V 1/48* (2013.01); *G08C 19/22* (2013.01); *H04L 41/083* (2013.01)

(58) Field of Classification Search  
None  
See application file for complete search history.

(56) References Cited

U.S. PATENT DOCUMENTS 3,992,694 A * 11/1976 Ehrlich ................ B06B 1/0618  
                                                     310/337  
2005/0046592 A1* 3/2005 Cooper ................ G01V 11/002  
                                                     340/855.7

(Continued)

FOREIGN PATENT DOCUMENTS

WO    2015156768 A1    10/2015

OTHER PUBLICATIONS

International Search Report and Written Opinion, PCT Application No. PCT/US2014/033217; dated Jan. 8, 2015; 14 pages.

*Primary Examiner* — Leon-Viet Nguyen  
(74) *Attorney, Agent, or Firm* — John Wustenberg; Parker Justiss, P.C.

(57) ABSTRACT

An in-well type acoustic telemetry system includes an elongate tubular housing, an elongate transmitter in the tubular housing, a receiver in the tubular housing, and a spring between the transmitter and the housing biasing the transmitter into acoustic coupling to the housing. The transmitter is adapted to generate an output acoustic signal by linearly fluctuating in response to an electrical signal. The receiver is adapted to generate another electrical signal by linearly fluctuating in response to an input acoustic signal.

20 Claims, 4 Drawing Sheets

(56) References Cited

U.S. PATENT DOCUMENTS

| | | | |
|---|---|---|---|
| 2006/0002232 A1* | 1/2006 | Shah | E21B 47/16 367/82 |
| 2006/0219438 A1 | 10/2006 | Moore et al. | |
| 2008/0247273 A1 | 10/2008 | Chemali et al. | |
| 2010/0165788 A1* | 7/2010 | Rayssiguier | E21B 47/16 367/25 |
| 2011/0176387 A1 | 7/2011 | Froelich | |
| 2013/0147316 A1* | 6/2013 | Matam | H01L 41/083 310/327 |
| 2013/0239673 A1* | 9/2013 | Garcia-Osuna | E21B 17/16 73/152.46 |
| 2017/0016319 A1* | 1/2017 | Kyle | E21B 47/16 |

* cited by examiner

ACOUSTICALLY COUPLED TRANSMITTER FOR DOWNHOLE TELEMETRY

CROSS-REFERENCE TO RELATED APPLICATION

This application is the National Stage of, and therefore claims the benefit of, International Application No. PCT/US/2014/033217 filed on Apr. 7, 2014, entitled "ACOUSTICALLY COUPLED TRANSMITTER FOR DOWNHOLE TELEMETRY," which was published in English under International Publication Number WO 2015/156768 on Oct. 15, 2015. The above-identified application is commonly assigned with this National Stage application and is incorporated herein by reference in their entirety.

BACKGROUND

The present disclosure relates to in-well acoustic telemetry systems for communications in subterranean well systems.

In-well type acoustic telemetry systems have difficulty transmitting adequate acoustic output, for example, when applied external pressure on a housing of the in-well type acoustic telemetry system can alter system response. There is a need to remove external factors that can alter acoustic transmission and reception in in-well type acoustic telemetry systems.

DESCRIPTION OF DRAWINGS

Like reference symbols in the various drawings indicate like elements.

DETAILED DESCRIPTION

Figure 1:
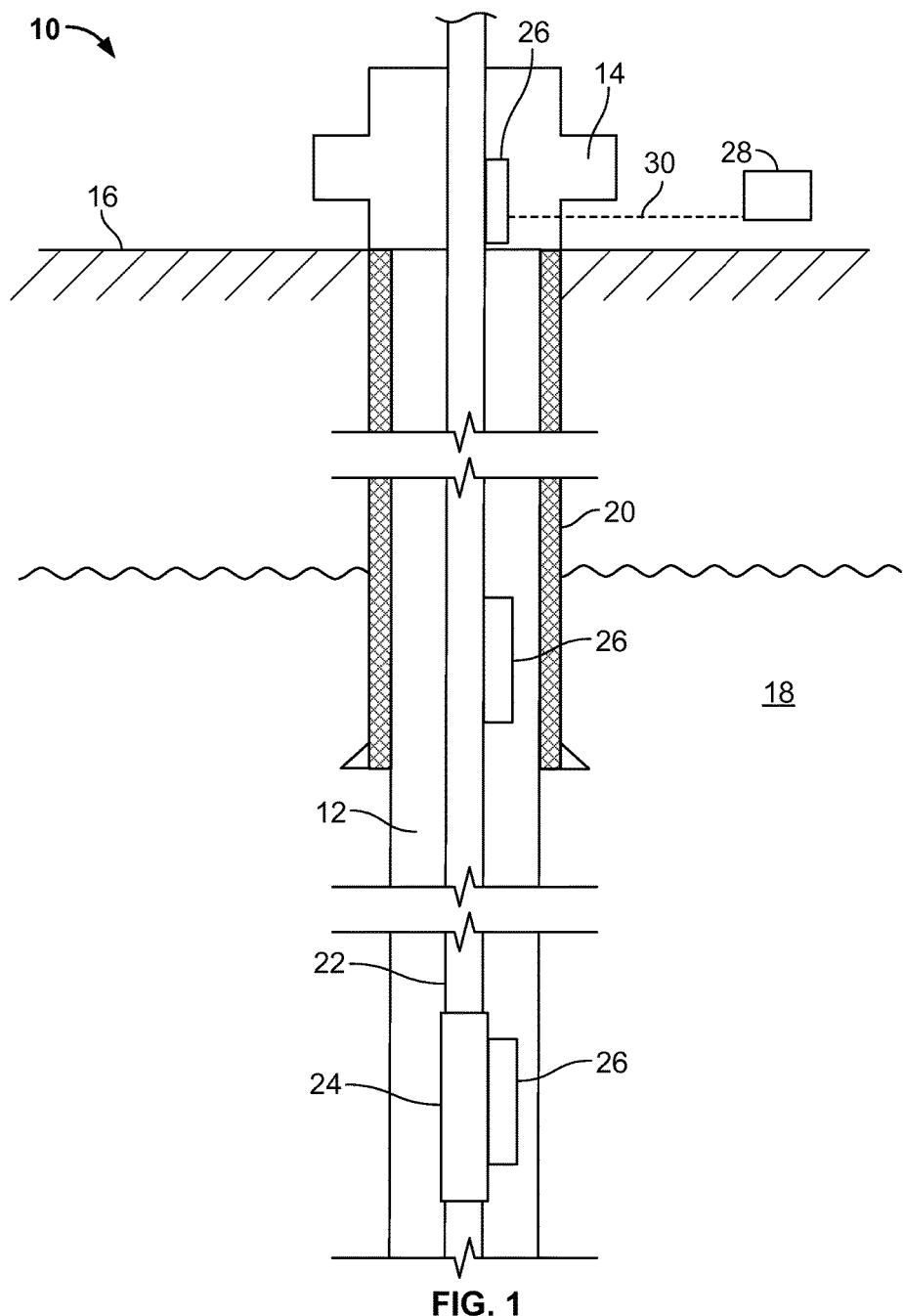
FIG. 1 is a schematic partially cross-sectional view of a well system with a well telemetry system.

FIG. 1 depicts an example well system 10 that includes a substantially cylindrical wellbore 12 extending from a wellhead 14 at the terranean surface 16 downward into the Earth into one or more subterranean zones of interest 18 (one shown). A portion of the wellbore 12 extending from the wellhead 14 to the subterranean zone 18 is lined with lengths of tubing, called casing 20. A well string 22 is shown as having been lowered from the surface 16 into the wellbore 12. The well string 22 is a series of jointed lengths of tubing coupled together end-to-end and/or a continuous (i.e., not jointed) coiled tubing, and can include one or more well tools 24 (one shown). FIG. 1 shows the well string 22 extending to the surface 16. In other instances, the well string 22 can be arranged such that it does not extend to the surface 16, but rather descends into the well on a wire, such as a slickline, wireline, e-line and/or other wire. The depicted well system 10 is a vertical well, with the wellbore 12 extending substantially vertically from the surface 16 to the subterranean zone 18. The concepts herein, however, are applicable to many other different configurations of wells, including horizontal, slanted or otherwise deviated wells, and multilateral wells with legs deviating from an entry well.

The well system 10 is also shown having a well telemetry system for sending and receiving telemetric communication signals encoded as acoustic vibrations carried on the well string 22 as vibrations in the materials of the well string 22 components. The well telemetry system includes in-well type telemetry elements 26 (three shown, but can include one, two, or four or more) and a surface telemetry station 28. In some instances, the well telemetry system is communicably coupled or otherwise associated with the well tool 24 to encode communications from the well tool 24 and decode communications to the well tool 24. The well tool 24 includes a sensor or sensors (e.g., LWD sensor, pressure sensor, accelerometer, rotational sensor, etc.) that generates an electrical signal that is received by a controller of the telemetry element 26, encoded (e.g., via pulse width modulator), and transformed into an acoustic signal. Communication to the well tool 24 is received at the in-well telemetry element 26, transformed to electrical signal, decoded by the controller of the telemetry element 26, and communicated to the well tool 24. Additional in-well type telemetry elements (not shown) can be provided for communication with other well tools, sensors and/or other components in the wellbore 12. The well telemetry system is acoustically coupled to the remainder of the well string 22 so that acoustic vibrations produced by the telemetry elements 26 go into the well string 22 and acoustic vibrations of the well string 22 are received by the telemetry elements 26. Although shown on the well string 22 and well tool 24, the well telemetry elements 26 of the telemetry system can be additionally or alternatively provided on other components in the well, including the casing 20. The in-well type telemetry elements 26 can communicate with each other and with the surface telemetry station 28 outside of the wellbore 12. For example, an uppermost well telemetry element 26 is electrically coupled to the surface telemetry station 28 via a wired connection 30 or wireless connection. The surface telemetry station 28 collects transmission signals from the well telemetry element(s) 26, and provides an interface for a user or computer to communicate with the well telemetry system. One example well telemetry system that the concepts herein can be applied to is the DynaLink® system, produced by and a registered trademark of Halliburton Energy Services, Inc.

Figure 2:
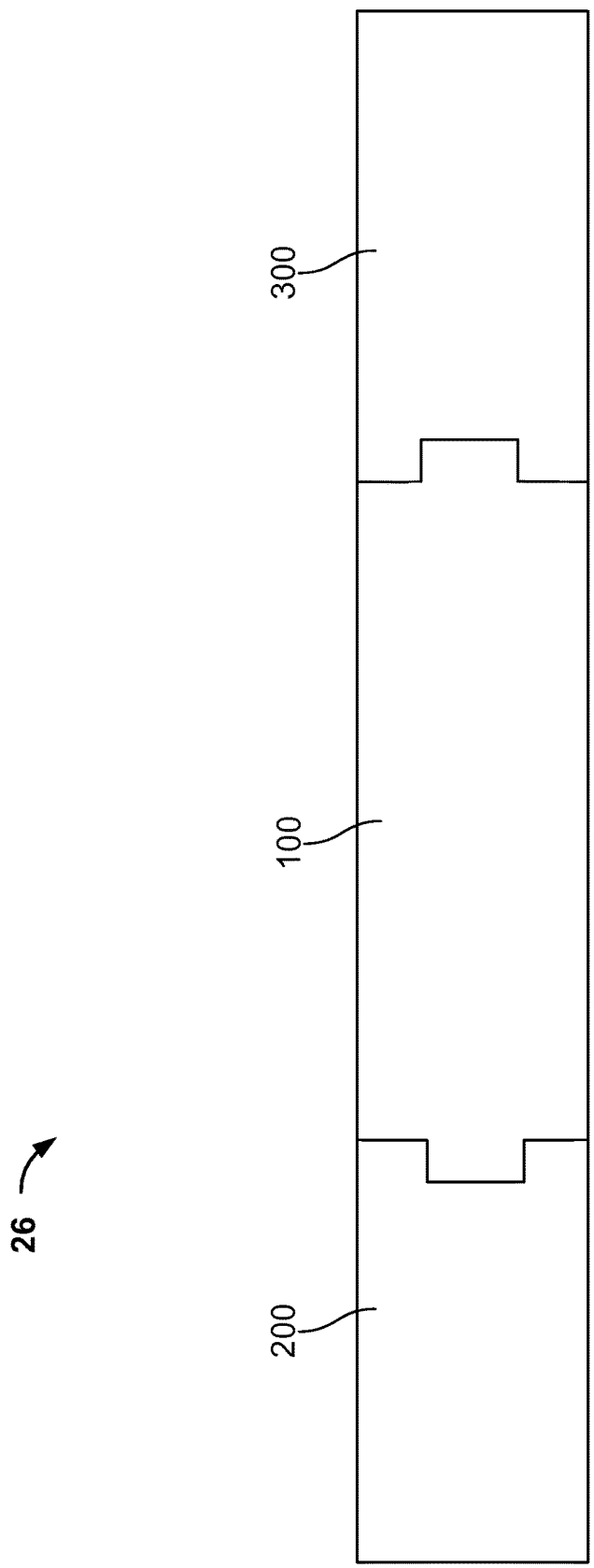
FIG. 2 is a schematic view of an example well telemetry element that can be used in the well telemetry system of FIG. 1.

FIG. 2 is a schematic view of an example in-well type telemetry element 26 of the well telemetry system of FIG. 1. The example in-well type telemetry element 26 includes an acoustic element 100, an electronics housing 200, and a power source 300 arranged linearly with the acoustic element 100 between the electronics housing 200 and the power source 300. In some instances, the acoustic element 100, electronics housing 200, and power source 300 are arranged differently. The example in-well type telemetry element 26 is cylindrical and connects with clamps, adhesive, and/or another connection to an in-well type component of a well system, for example, the well string 22 and/or well tool 24 of the example well system 10 of FIG. 1. In some instances, the example telemetry element 26 is not cylindrical. The acoustic element 100 receives acoustic communication signal and translates the acoustic communication signal to electrical signal sent to the electronics housing 200. The acoustic element 100 also transmits acoustic communication signal based on electrical signal from the electronics housing 200. The power source 300 provides power to the acoustic element 100 and the electronics housing 200.

Figure 3:
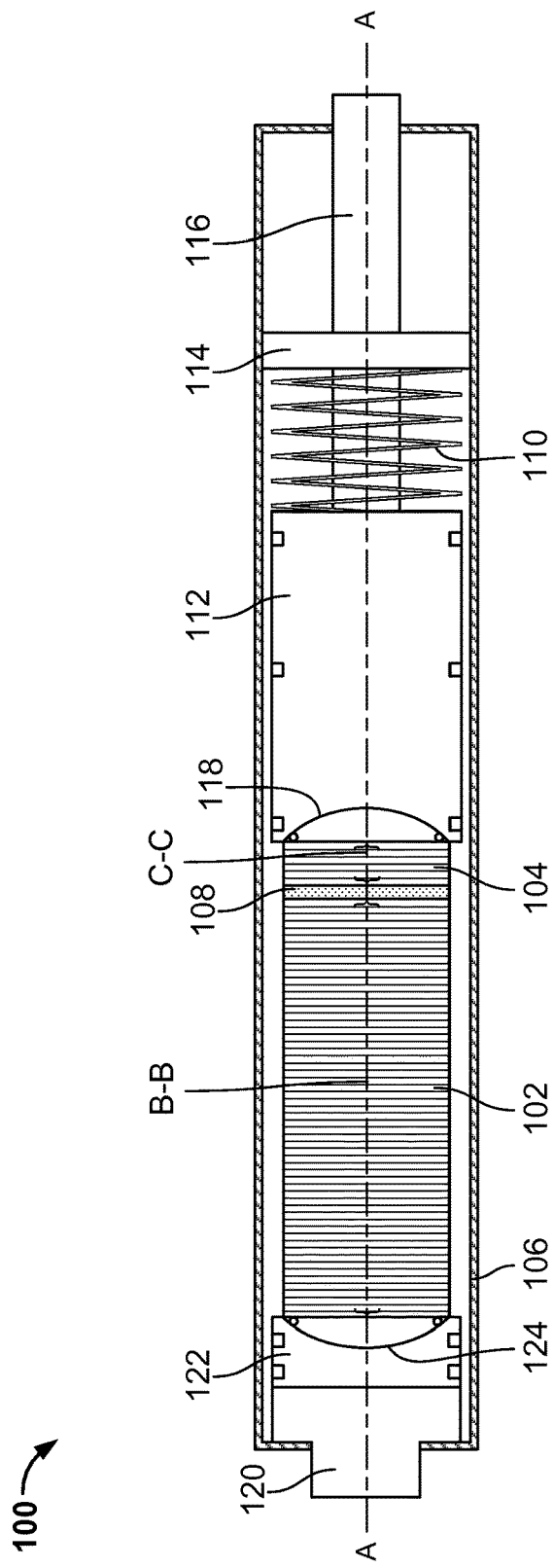
FIG. 3 is a detail, half cross-sectional view of an example in-well type acoustic element that can be used in the well telemetry element of FIG. 2.

FIG. 3 is a detail cross-sectional view of an example in-well type acoustic element 100 that can be used in an in-well type telemetry element 26 of FIG. 2. The example acoustic element 100 translates acoustic communication signals into electrical signals and electrical signals into acoustic communication signals. The example acoustic element 100 includes an elongate transmitter 102 and a receiver 104 in an elongate tubular housing 106. In certain instances, the elongate tubular housing 106 includes a length that is greater than its width. The elongate transmitter 102 is adapted to generate an output acoustic signal for telemetric communication by linearly fluctuating along a transmitter axis B-B in response to an electrical signal. As depicted in FIG. 3, the receiver 104 is adapted to generate an electrical signal from a received acoustic telemetric communication when linearly fluctuated along a receiver axis C-C that coincides with the transmitter axis B-B by the acoustic energy of the communication signal. For example, fluctuating of the transmitter 102 can include successive expanding and contracting of material along the transmitter axis B-B in response to voltage and/or current from a power source. Similarly, fluctuating of the receiver 104 can include successive expanding and contracting of material along the receiver axis C-C. The receiver 104 is electrically isolated from the transmitter 102 in that the receiver 104 is not directly connected to the transmitter 102 via a direct wire or other direct connection. The receiver 104 is electrically isolated from the transmitter 102 so that input acoustic signal to the receiver 104 does not affect output acoustic signal from the transmitter 102. In some instances, the receiver axis C-C is parallel to, but does not coincide with, the transmitter axis B-B of the transmitter 102. In certain instances, the transmitter axis B-B coincides with a longitudinal axis of the housing 106, for example, a center longitudinal axis A-A of the housing 106.

In the example shown in FIG. 3, the housing 106 is a cylinder, and the transmitter 102 includes a laminated stack of piezoceramic wafers that strain along the transmitter axis B-B in response to electrical signal. Similarly, the receiver 104 includes an adjacent laminated stack of piezoceramic wafers that can convert strain along the receiver axis C-C into electrical signal. The laminated stacks of piezoceramic wafers form a cylindrical transmitter 102 and cylindrical receiver 104 in the housing 106. In some instances, the transmitter 102 and/or receiver 104 includes another, different electrically responsive material that may or may not be in a laminated stack, such as an electromagnetic driver (e.g., voice coil), a piezoelectric, a piezopolymer, a magnetostrictor, an electrostrictor, and/or a ferroelectric material. The transmitter 102 and the receiver 104 can include the same electrically responsive material, different electrically responsive materials, or a combination of the same and different materials.

The transmitter 102 is shown in FIG. 3 to be longer than the receiver 104 since the transmitter 102 tends to utilize more length to transmit acoustic signal than the receiver utilizes to receive acoustic signal. In some instances, acoustic output of the transmitter 102 is dependent on the length of the transmitter 102, an amount of power sent to the transmitter 102, or a combination of these, such that the greater the length and/or the greater the supplied power, the greater the acoustic output of the example in-well type acoustic element 100. The relative sizes of the transmitter 102 and the receiver 104 can be different. For example, the receiver 104 can be longer than the transmitter 102, or the receiver 104 can be substantially or exactly the same length as the transmitter 102. FIG. 3 shows the transmitter 102 adjacent to the receiver 104. In some instances, the transmitter 102 is not adjacent to the receiver 104, for example, the transmitter 102 is spaced apart from the receiver 104 within the housing 106.

In some instances, the transmitter 102 is in acoustic series with the receiver 104. For example, the transmitter 102 and the receiver 104 can be a laminated stack of piezoceramic wafers or other electrically responsive material, where a first portion of the wafers in the laminated stack make up the transmitter 102 and a second portion of the wafers in the laminated stack make up the receiver 104. The receiver 104 includes about ten percent of the wafers in the laminated stack, and the transmitter 102 includes a remainder of the wafers in the laminated stack. In some instances, the receiver 104 includes a different percentage of the wafers in the laminated stack. In certain instances, the transmitter 102 and the receiver 104 are separated by a spacer 108, such that the transmitter 102 is electrically isolated from the receiver 104. For example, the spacer 108 can include insulation, an open space, or a different electrically isolating material.

In certain instances, the transmitter 102 and receiver 104 are configured as a unitary transceiver. The transmitter 102 and the receiver 104 can include the same material, have the same orientation, stack adjacently, be linearly and/or axially aligned, and/or be configured in another way that allows reception and transmission of acoustic signal with the unitary transceiver. In some instances, the unitary transceiver includes the transmitter 102 and the receiver 104 configured in mechanical series and acoustic series to form a single part, such that the single part of the transceiver allows for individual or simultaneous reception and transmission of acoustic signal. The transmitter 102 and the receiver 104 are affixed or formed together to form the single part of the transceiver. In other instances, the unitary transceiver is a single stack of electrically responsive material that is alternately used for transmitting and receiving acoustic signal. For example, the single stack of the transceiver is used for a first time interval as a receiver, and the single stack of the transceiver is used for a second, different time interval as a transmitter.

The example in-well type acoustic element 100 of FIG. 3 includes a spring 110 between the transmitter 102 and the housing 106, and a receiver cap 112 between the transmitter 102 and the spring 110. The spring 110 and the receiver cap 112 are cylindrical, and the receiver cap is designed to fit closely within the inner diameter of the housing 106 so that the receiver cap 112 moves axially (e.g., along a longitudinal axis of the housing), guided by inner sidewalls of the housing 106. The spring 110 abuts a housing nut 114 adjustably secured to the housing 106. The housing nut 114 clamps the spring 110, receiver cap 112, receiver 104, and transmitter 102 in the housing such that the transmitter 102 is acoustically coupled to a portion of the housing 106. An axial position of the housing nut 114 is adjustable along the center longitudinal axis A-A of the housing 106 to tighten or loosen a clamping force against the spring. In some instances, the housing 106 includes threading on the inner diameter surface of the housing 106, and the housing nut 114 includes threading on an outer diameter of the housing nut 114 to mate with the threading on the housing 106. For example, the nut 114 can threadably secure to the housing 106 to clamp the spring 110 and hold the transmitter 102, the receiver 104, and the receiver cap 112 within the housing 106.

The spring 110 presses against a portion of the receiver cap 112, and the receiver cap 112 presses against the receiver 104 and/or transmitter 102 to bias the transmitter 102 into acoustic coupling to a portion of the housing 106 (described below). The housing nut 114 clamps the spring 110 against the receiver cap 112 such that the spring 110 is under compression and tends to want to expand, thus biasing the transmitter 102 against the housing 106. The spring 110 is (substantially or directly) in line with the transmitter axis B-B of the transmitter 102, such that the spring 110 allows the receiver cap 112 to follow the fluctuations of the transmitter 102 while keeping the transmitter 102 in acoustic coupling with the housing 106. The spring 110 has a spring rate and spring force sufficient to provide consistent force against the receiver cap 112 to ensure contact between the receiver cap 112 and the transmitter 102, and acoustic contact of the transmitter 102 with the housing 106, for example, as the transmitter 102 fluctuates along its transmitter axis B-B. In some instances, the example in-well type acoustic element 100 includes a washer on one or both longitudinal ends of the spring 110, for example, to keep the spring 110 from binding. In some instances, the example in-well type acoustic element 100 includes two or more springs. The spring 110 can take many forms, for example, a compression spring, a torsion spring, a tension spring, a polymer spring, a gas spring, an expanding material, and/or another type of material adapted to provide a force against the receiver cap 112.

In some instances, the receiver cap 112 includes a centralizer, for example, a centering element (e.g., O-ring) in a shaped indentation 118 on a surface of the receiver cap 112 adjacent to the transmitter 102 and/or receiver 104, to stabilize the transmitter 102 and/or receiver 104 against the receiver cap 112. The receiver cap 112 generally includes a dense material, such as tungsten, aluminum, steel, and/or other, in order to optimize reactive mass. The receiver cap 112 acts against fluctuations of the transmitter 102 such that acoustic energy from the fluctuations of the transmitter transfers more into the housing 106 than the receiver cap 112. The receiver cap 112 resists reactive motion from the fluctuations of the transmitter 102 depending on the density of the receiver cap 112. For example, a high density receiver cap is more difficult to oscillate than a lower density receiver cap, so a high density receiver cap promotes more acoustic energy from a transmitter to a housing than a lower density receiver cap.

As shown in FIG. 3, the portion of the housing 106 that the transmitter 102 acoustically couples to includes a cup 122. The cup 122 acts to acoustically couple the transmitter 102 and the housing 106 such that fluctuations in the transmitter 102 are translated into acoustic signal through the housing 106. The cup 122 includes a centralizer, for example, a shaped indentation 124 on a surface of the cup 122 adjacent the transmitter 102 to receive an end of the transmitter 102 and stabilize the transmitter 102 against the cup 122. In certain instances, the indentation 124 is semispherical or hemi-spherical, and the transmitter 102 includes an end cap with a corresponding, mating shape to match the semi-spherical or hemi-spherical indentation 124. The semi-spherical or hemi-spherical indentation 124 can center the transmitter 102 in the housing 106. The cup 122 can be placed proximal to or embedded in a longitudinal end of the housing 106. In some instances, the transmitter 102 acoustically couples to a longitudinal end facing surface of the housing 106 without the cup 122. In other instances, the transmitter 102 acoustically couples to a different portion of the housing 106, for example, a shoulder area of an interior surface of the housing 106.

As depicted in FIG. 3, the receiver cap 112 abuts the receiver 104 to press the receiver 104 against the transmitter 102 and the transmitter 102 against the housing 106. The example in-well type acoustic element 100 can operate in a number of positions and configurations different than what is shown in FIG. 3. For example, the receiver 104 can reside between the receiver cap 112 and the spring 110, such that the spring 110 abuts the receiver 104, the receiver abuts the receiver cap 112, and the receiver cap 112 abuts the transmitter 102 into acoustic coupling with the housing 106. In another example, the receiver is between the housing nut 114 and the spring 110. In some instances, the transmitter 102, receiver 104, receiver cap 112, and housing nut 114 reside on the transmitter axis B-B. In instances where the transmitter 102, receiver 104, receiver cap 112, and housing nut 114 are aligned within the housing 106 along the transmitter axis B-B, the alignment order can be different. In FIG. 3, the portion of the housing 106 abuts the transmitter 102, the transmitter 102 abuts the receiver 104, the receiver 104 abuts the receiver cap 112, the receiver cap 112 abuts the spring 110, and the spring 110 abuts the housing nut 114. In some instances, the portion of the housing 106 abuts the transmitter 102, the transmitter 102 abuts the receiver cap 112, the receiver cap 112 abuts the receiver 104, the receiver 104 abuts the spring 110, and the spring 110 abuts the housing nut 114. In other instances, the alignment order is different, provided the transmitter 102 acoustically couples to a portion of the housing 106.

Referring to FIGS. 2 and 3, the example in-well type acoustic element 100 connects to the electronics housing 200 to allow data communication between the electronics housing 200 and the receiver 104 and/or transmitter 102 within the housing 106. The electronics housing 200 includes a controller to receive electrical signal from and transmit electrical signal to the transmitter 102 and/or receiver 104. In some instances, the receiver cap 112 includes an extension 116 through the housing nut 114, for example, to allow for connection to the controller, another component in the electronics housing 200, and/or another component of an in-well type telemetry system. In some instances, the extension 116 is a tubular extension that extends (substantially or directly) along a longitudinal axis of the housing 106. An optional seal between the extension 116 of the receiver cap 112 and the housing nut 114, and/or between the extension 116 of the receiver cap 112 and a longitudinal end of the housing 106, prevents fluid and/or gas permeation into or out of the housing 106. In some instances, the seal is an O-ring of teflon, plastic, elastomer, nylon, or another material. In other instances, the seal is a different type of static or dynamic seal. The seal seals the housing 106 from an ambient environment such that the housing 106 acts as a pressure barrier.

Referring again to FIGS. 2 and 3, the example in-well type acoustic element 100 connects to the power source 300 to allow power to components in the in-well type acoustic element 100 and components in the electronics housing 200. The housing 106 of the example in-well type acoustic element 100 includes an attachment point 120 to a battery housing including a power source, for example, a battery, on a longitudinal end of the housing 106 to provide power to the transmitter 102, receiver 104, and/or other components in the example in-well type acoustic element 100. In some instances, the attachment point 120 of the housing 106 includes a threaded connection to the battery housing on the longitudinal end of the housing 106 such that the housing 106 and the battery housing are axially aligned. The battery can provide electrical power to the transmitter 102 to fluctuate along the transmitter axis B-B and transmit acoustic signal through the housing 106.

Figure 4:
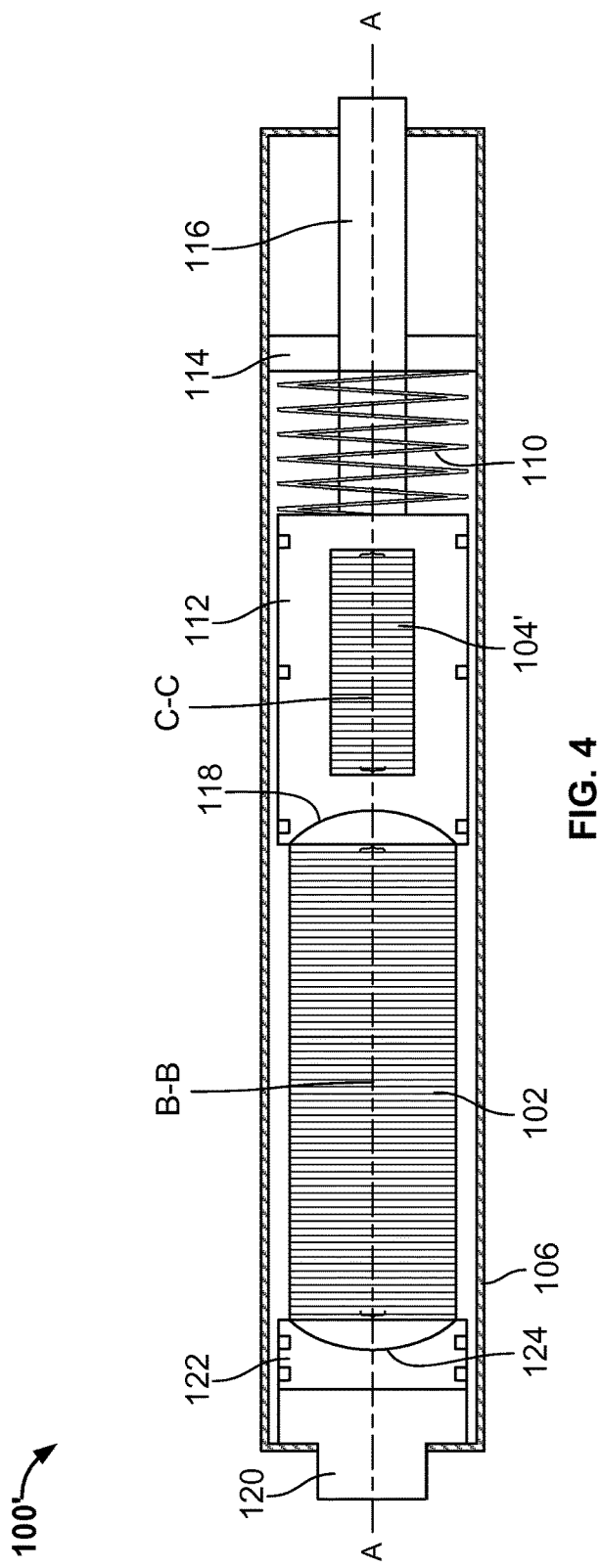
FIG. 4 is a detail, half cross-sectional view of an example in-well type acoustic element that can be used in the well telemetry element of FIG. 2.

FIG. 4 is a detail cross-sectional view of an example in-well type acoustic element 100' that can be used in the in-well type telemetry element 26 of FIG. 2. The example in-well type acoustic element 100' is like the example in-well type acoustic element 100 of FIG. 3, except the receiver 104' is attached to the receiver cap 112. The receiver 104' is different than the receiver 104 of FIG. 3 in that the receiver 104' does not include piezoceramic wafers arranged in cylindrical disks, and the receiver axis C-C does not coincide with the transmitter axis B-B. The receiver 104' includes an electrically responsive material that attaches to the receiver cap 112, for example, via adhesive or another type of attachment. In some instances, the receiver 104' attaches to a different component of the example in-well type acoustic element 100'.

Certain aspects may provide various advantages. In some instances, the spring ensures acoustic coupling between the transmitter 102 and the housing 106 as the housing 106 expands, contracts, and/or bends in response to environmental factors, such as thermal expansion, thermal contraction, torsional and tension forces, and/or other factors. In other instances, the centralizers in the receiver cap 112 and the cup 122 ensure axial alignment of the transmitter 102 and/or receiver 104. Axial alignment of the transmitter 102 and receiver can reduce sensitivity to environmental conditions, and increase acoustic sensitivity in reception and transmission in a specific direction. In certain instances, a pressure sealed housing 106 allows for better acoustic sensitivity in reception and transmission. In some instances, configuring the transmitter 102 and receiver 104 as a unitary transceiver allows for both reception and transmission of acoustic communication signal with a single unit. A receiver part of the unitary transceiver is sensitive to acoustic signal in the same axial direction as a transmitted acoustic signal from the transmitter part of the unitary transceiver.

In view of the discussion above, certain aspects encompass, an in-well type acoustic telemetry system including an elongate tubular housing, an elongate transmitter in the tubular housing, a receiver in the tubular housing, and a spring between the transmitter and the housing biasing the transmitter into acoustic coupling to the housing. The transmitter is adapted to generate an output acoustic signal by linearly fluctuating in response to an electrical signal. The receiver is adapted to generate another electrical signal by linearly fluctuating in response to an input acoustic signal.

Certain aspects encompass, a method where an elongate transmitter is acoustically coupled to a tubular housing with a spring. An output acoustic telemetry signal is generated in a subterranean well by linearly fluctuating the transmitter in response to an electrical signal, while the transmitter is acoustically coupled to the tubular housing with the spring.

Certain aspects encompass, an in-well type transmitter including a housing, a transmitter in the housing, and a carrier carrying an end of the transmitter to move axially relative to the housing.

The aspects above can include some, none, or all of the following features. The spring abuts a receiver cap between the transmitter and the spring. The receiver cap includes tungsten. The receiver attaches to the receiver cap. The in-well type acoustic telemetry system includes a housing nut in the housing adapted to threadably secure to the housing and abut an end of the spring. The transmitter linearly fluctuates along a transmitter axis, and the transmitter, receiver cap, and spring reside on the transmitter axis. The housing includes a metal cup receiving an end of the transmitter, and the metal cup is adapted to transfer acoustic energy from the transmitter out of the housing. The housing is a pressure barrier. Generating, in a subterranean well, an output acoustic telemetry signal by linearly fluctuating the transmitter in response to an electrical signal includes imparting vibrations from the transmitter out of the housing. Generating, in a subterranean well, an output acoustic telemetry signal by linearly fluctuating the transmitter in response to an electrical signal includes damping housing stress factors with the spring. The housing stress factors include at least one of bending, thermal expansion, and thermal contraction of the housing. The method includes receiving an input acoustic telemetry signal by linearly fluctuating a receiver in response to the input acoustic telemetry signal. Receiving an input acoustic telemetry signal includes linearly fluctuating the receiver in response to the input acoustic telemetry signal. The carrier includes a spring to bias the transmitter into acoustic coupling with the housing. The carrier includes a mass between the transmitter and the spring. The mass includes tungsten. The transmitter, spring, and mass are aligned along a transmitter axis. The in-well type transmitter includes a receiver in the housing, and the receiver attaches to the mass.

A number of embodiments have been described. Nevertheless, it will be understood that various modifications may be made. Accordingly, other embodiments are within the scope of the following claims.

What is claimed is:

1. An in-well type acoustic telemetry system, comprising:
   an elongate tubular housing;
   an elongate transmitter in the tubular housing adapted to generate an output acoustic signal by linearly fluctuating in response to an electrical signal;
   a receiver in the tubular housing adapted to generate another electrical signal by linearly fluctuating in response to an input acoustic signal;
   a spacer adapted to electrically isolate the transmitter from the receiver; and
   a spring between the transmitter and the housing biasing the transmitter into acoustic coupling to the housing,
   wherein the transmitter corresponds to a first portion of a laminated stack of electrically responsive material, the receiver corresponds to a second portion of the laminated stack of electrically responsive material, and the spacer is located between the first and second portions of the laminated stack of electrically responsive material.

2. The system of claim 1, where the spring abuts a receiver cap between the transmitter and the spring.

3. The system of claim 2, where the receiver cap comprises tungsten.

4. The system of claim 2, where the receiver attaches to the receiver cap.

5. The system of claim 2, further comprising a housing nut in the housing adapted to threadably secure to the housing and abut an end of the spring.

6. The system of claim 2, where the transmitter linearly fluctuates along a transmitter axis; and
   where the transmitter, receiver cap, and spring reside on the transmitter axis.

7. The system of claim 1, where the housing comprises a metal cup receiving an end of the transmitter, the metal cup adapted to transfer acoustic energy from the transmitter out of the housing.

8. The system of claim 1, wherein the spacer, the transmitter and the receiver are enclosed in the housing.

9. A method, comprising:
   acoustically coupling an elongate transmitter to a tubular housing with a spring;

electrically isolating a receiver from the transmitter using a spacer, wherein the transmitter corresponds to a first portion of a laminated stack of electrically responsive material, the receiver corresponds to a second portion of the laminated stack of electrically responsive material, and the spacer is located between the first and second portions of the laminated stack of electrically responsive material; and generating, in a subterranean well, an output acoustic telemetry signal by linearly fluctuating the transmitter in response to an electrical signal, while acoustically coupling the transmitter to the tubular housing with the spring.

10. The method of claim 9, where generating, in a subterranean well, an output acoustic telemetry signal by linearly fluctuating the transmitter in response to an electrical signal comprises imparting vibrations from the transmitter out of the housing and into a material of a well string in the subterranean well.

11. The method of claim 9, where generating, in a subterranean well, an output acoustic telemetry signal by linearly fluctuating the transmitter in response to an electrical signal comprises damping housing stress with the spring.

12. The method of claim 11, where the housing stress damped comprises at least one of bending, axial, and thermal stress.

13. The method of claim 9, further comprising receiving an input acoustic telemetry signal, wherein receiving an input acoustic telemetry signal includes linearly fluctuating the receiver in response to the input acoustic telemetry signal.

14. The method of claim 8, wherein the transmitter, the receiver and the spacer are enclosed in the tubular housing.

15. An in-well type transmitter, comprising:
a housing;
a transmitter in the housing;
a receiver in the housing electrically isolated from the transmitter by a spacer, wherein the transmitter corresponds to a first portion of a laminated stack of electrically responsive material, the receiver corresponds to a second portion of the laminated stack of electrically responsive material, and the spacer is located between the first and second portions of the laminated stack of electrically responsive material; and
a carrier carrying an end of the transmitter to move axially relative to the housing.

16. The in-well type transmitter of claim 15, where the carrier comprises a spring to bias the transmitter into acoustic coupling with the housing.

17. The in-well-type transmitter of claim 16, where the carrier comprises a mass between the transmitter and the spring.

18. The in-well type transmitter of claim 17, where the mass comprises tungsten.

19. The in-well type transmitter of claim 17, where the transmitter, the spring, and the mass are aligned along a transmitter axis.

20. The in-well type transmitter of claim 15, wherein the spacer, the transmitter and the receiver are enclosed in the housing.

\* \* \* \* \*